United States Patent
Weber et al.

(10) Patent No.: US 7,217,466 B2
(45) Date of Patent: May 15, 2007

(54) WEAR-RESISTANT COATING FOR METAL-REMOVING TOOLS, PARTICULARLY FOR ROTARY METAL-CUTTING TOOLS

(75) Inventors: Frank-R Weber, Berlin (DE); Eberhard Moll, Berlin (DE)

(73) Assignee: Joerg Guehring, Albstadt (DE)

( * ) Notice: Subject to any disclaimer, the term of this patent is extended or adjusted under 35 U.S.C. 154(b) by 0 days.

(21) Appl. No.: 10/393,183

(22) Filed: Mar. 20, 2003

(65) Prior Publication Data
US 2004/0005981 A1 Jan. 8, 2004

(30) Foreign Application Priority Data
Mar. 20, 2002 (DE) .................. 102 12 383

(51) Int. Cl.
*C23C 30/00* (2006.01)
(52) U.S. Cl. .................. 428/697; 51/307; 51/309; 428/698; 428/699
(58) Field of Classification Search ............. 428/697, 428/699, 698, 216, 336; 51/307, 309
See application file for complete search history.

(56) References Cited

U.S. PATENT DOCUMENTS

| | | | | |
|---|---|---|---|---|
| 4,436,830 A | * | 3/1984 | Andreev et al. | 501/96.1 |
| 4,554,201 A | * | 11/1985 | Andreev et al. | 428/699 |
| 5,503,912 A | * | 4/1996 | Setoyama et al. | 428/699 |
| 5,525,420 A | * | 6/1996 | Kaufmann | 428/469 |
| 5,700,551 A | * | 12/1997 | Kukino et al. | 428/698 |
| 5,882,777 A | * | 3/1999 | Kukino et al. | 428/698 |
| 6,033,734 A | | 3/2000 | Muenz et al. | 427/309 |
| 6,033,768 A | | 3/2000 | Muenz et al. | 428/216 |
| 6,309,738 B1 | * | 10/2001 | Sakurai | 428/216 |
| 6,492,011 B1 | * | 12/2002 | Brandle et al. | 428/697 |
| 2002/0132141 A1 | | 9/2002 | Toihara | 428/698 |

FOREIGN PATENT DOCUMENTS

| | | | |
|---|---|---|---|
| DE | 3532733 | * | 6/1986 |
| DE | 3545636 | * | 6/1997 |
| DE | 198 18 782 A 1 | | 10/1999 |
| EP | 0756019 B1 | | 4/1996 |

(Continued)

OTHER PUBLICATIONS

Wadsworth, Smith, Donohue, Munz; "Thermal stability and oxidation resistance of TiAlN/CrN multilayer coatings"; Surface and Coatings Technology, 94-95; 1997; pp. 315-321.

(Continued)

*Primary Examiner*—Archene Turner
(74) *Attorney, Agent, or Firm*—Boyle Fredrickson Newholm Stein & Gratz S.C.

(57) ABSTRACT

The invention concerns a wear-resistant coating on rotary metal-cutting tools such as drill bits, countersinks, milling cutters, screw taps, reamers, etc. The coating according to the invention consists essentially of nitrides of Cr, Ti and Al with a unusually high share of Cr atoms, namely 30 to 60% referred to the totality of metal atoms. In multilayer coatings and even more in coatings made of homogeneous mixed phases, this high Cr share results in particularly large tool life distances for the tools hardened with these coatings. These tools exhibit their superiority particularly during dry use without cooling lubricants or with minimal lubrication.

16 Claims, 5 Drawing Sheets

FOREIGN PATENT DOCUMENTS

| | | | |
|---|---|---|---|
| EP | 756019 | * | 1/1997 |
| EP | 1132498 | * | 9/2001 |
| EP | 1219723 | * | 7/2002 |
| EP | 1219723 A3 | | 9/2002 |
| JP | 04128363 | | 4/1992 |
| JP | 08-120445 | * | 5/1996 |
| JP | 09-256138 | * | 9/1997 |
| JP | 09-295204 | * | 11/1997 |
| JP | 09-300105 | * | 11/1997 |
| JP | 09-323204 | * | 12/1997 |
| JP | 09-323205 | * | 12/1997 |
| JP | 10-168583 | * | 6/1998 |
| JP | 10-251831 | * | 9/1998 |
| JP | 11-131216 | * | 5/1999 |
| JP | 11-156992 | * | 6/1999 |
| JP | 2000297365 | * | 10/2000 |
| JP | 2001254187 | * | 9/2001 |
| WO | 99/55936 | * | 11/1999 |
| WO | WO 2005/038089 | | 4/2005 |

OTHER PUBLICATIONS

Smith, Munz, Donohue, Petrov, Greene; "Improved TiAlN PVD Coatings For Dry High Speed Cutting Operations"; Surface Engineering; vol. 14, No. 1; 1997; pp. 37-41.

Lembke et al., Significance of Y and Cr in TiAlN Hard Coatings for Dry High Speed Cutting, Surface Engineering, 2001, pp. 153-158, vol. 17 No. 2.

Yang et al., Properties and Performance of CrTiAlN Multilayer Hard Coatings Deposited Using Magnetron Sputter Ion Plating, Surface Engineering, 2002, pp. 391-396, vol. 18 No. 5.

Muenz et al., Properties of Various Large-Scale Fabricated TiAlN- and CrN-based Superlattice Coatings Grown by Combined Cathodic Arc-Unbalanced Magnetron Sputter Deposition, Surface and Coatings Technology, 2000, 269-277, 125.

Hovsepian et al., Recent Progress in Large-Scale Production of Nanoscale Multilayer/Superlattice Hard Coatings, Vacuum, 2003, 27-36, 69.

* cited by examiner

WEAR-RESISTANT COATING FOR METAL-REMOVING TOOLS, PARTICULARLY FOR ROTARY METAL-CUTTING TOOLS

BACKGROUND OF THE

1. Field of the Invention

The present invention concerns the hardening of tools with the aid of hard wear-resistant coatings. The tools considered are metal-removing tools, particularly rotary shaft tools such as drill bits, countersinks, screw taps, reamers, etc. for processing of metals in which metal is removed. The wear-resistant coatings are roughly 1 to 10 μm thick hard material coatings which are preferably deposited on the tool surface using physical vapor deposition (PVD).

2. Description of Related Art

The technical community has been concerned for some time now with finding a wear-resistant coating for the dry machining of metals. In this context, metal removal without any cooling agent or lubricant, but also metal removal with a minimal quantity of lubrication, is designated as dry, stable processing.

In developing the coating and particularly in selecting the coating material, an underlying consideration was that the tool assumes substantially higher temperatures during dry machining and that this undesirable temperature increase can be reduced if the largest possible share of the heat is carried away not via the tool but rather via the chips. It was considered accordingly to combine materials which were known either for a high elevated temperature hardness and/or a high oxidation stability and/or a low thermal conductivity.

The most common wear-resistant coating consists of golden-yellow titanium nitride, TiN. TiN coatings have universal applications. Coatings made of the dark blue-red lustrous titanium aluminum nitride (Ti,Al)N are known for their high elevated temperature hardness. They mostly have a percent ratio of titanium to aluminum atoms of 50:50 or rather $(Ti_{0.5}, Al_{0.5})N$, which is occasionally also shifted in the direction 40:60 or rather $(Ti_{0.4}, Al_{0.6})N$. In the hardening of tools, they have applications as a single layer coating (see, e.g., Gilles et al., Surface and Coatings Technology 94–95 (1997) 285–290) as well as a multilayer (Ti,Al)N/TiN coating with intermediate layers made of titanium nitride (see, e.g., the so-called FIRE coating by Gühring oHG).

CrN coatings are recommended for processing of nonferrous metals (see, e.g., P. Hones, Surface and Coatings Technology 94–95 (1997) 398–402).

Also known are MeCrAlY alloys (Me=metal) for coating turbine blades. They increase the oxidation stability and the thermal insulation and thus the allowable temperature and the efficiency of airplane engines (see, e.g., W. Brandl et al., Surface and Coatings Technology 94–95 (1997) 21–26).

Recently, a multilayer coating made of (Ti,Al)N and CrN has become known (see, e.g., I. Wadsworth et al., Surface and Coatings Technology 94–95 (1997) 315–321). Its oxidation stability grew as the Cr share was increased, at least up to Cr shares of 30%. In the same laboratory, coatings made of TiAlN with minor additions of Cr and Y were also studied (patent document DE 19818782, application date Apr. 27, 1998).

SUMMARY OF THE PRESENT INVENTION

The underlying object of the invention is therefore to create a wear-resistant coating of the object described in the introduction which, while simple to fabricate, is distinguished by superior wear behavior, particularly in so-called dry machining and with minimal lubrication.

The inventors have fabricated and optimized tools made of high speed steel (HSS) and hard metal with diverse layers and layer systems from the following components: nitrides of the metals chromium, aluminum and titanium and a small addition (about 1%) of yttrium for grain refining. The optimization encompassed the followed work procedures: (1) coating, (2) analysis of the coating composition, phase determination and texture investigation, (3) drilling attempts with different application parameters, (4) measurement of the wear behavior during the drilling attempts, (5) evaluation and results, (6) coating of the same tools with a coating having a modified percentage composition of the metal atoms, etc.

It was discovered that the best wear behavior is obtained through the increase according to the invention in the Cr share in the overall metal content to values between 30 and 65%, preferably 30 to 60%, particularly preferred 40 to 60%. The shares of Al and Ti are decreased correspondingly to 15 to 35%, preferably 7 to 25%, or rather to 16 to 40%, preferably 16 to 35%, particularly preferred 24 to 35%. As shown by the comparative application tests, it was possible to decisively extend the lifespans with respect to the prior art. The result is surprising and was not expected as such, since as is known the multilayer coating (Ti,Al)N/TiN and not CrN is deemed to be the most suitable coating material for such uses.

A further aim of the investigations by the inventors was to answer the question of whether a single coating or a multilayer coating provides longer lifespans. The trials were thus performed twice, on the one hand with single coatings made of a homogeneous mixed phase and on the other hand with multilayer coatings made of multiple double coatings with the coating sequence (Ti,Al,Y)N/CrN. The result was in favor of the single coating, even it was not very clear. However, it was found that the high Cr share in the overall coating is more important than the coating structure.

The question of whether in the multilayer coating the first layer on the HSS or hard metal substrate should be advantageously a CrN or a (Ti,Al,Y)N coating could not be answered unambiguously. On the other hand, the trial results delivered a clear answer in favor of CrN to the question of whether the last (topmost) layer should be advantageously a CrN or a (Ti,Al,Y)N layer.

DETAILED DESCRIPTION OF THE PREFERRED EMBODIMENTS

Preferred specific embodiments of the wear-resistant coating according to the invention are described hereafter based on three examples and comparative application tests. The description encompasses the fabrication process and the characterization through XPS analysis and x-ray diffraction, and refers to nine figures.

EXAMPLE 1

Using an arc coating process, (Ti, Al, Cr, Y)N individual layers were deposited on HSS and hard metal shaft tools. A Cr cathode and a (Ti,Al,Y) cathode were used as vapor sources. Process parameters: substrate temperature $T_S=450°$ C., bias voltage $U_B=-50$ V, total ion current $J_{ion}=14$ A on the sample substrates to be coated, cathode current for the Cr or rather TiAlY cathodes $I_k=300$ A, pure nitrogen plasma (nitrogen partial pressure $p_{N2}=5$ Pa).

The coating process was preceded by a substrate cleaning using plasma-supported etching (bombardment with Ar ions from a low-voltage arc discharge). HSS tools, full hard-metal tools and flat sample substrates were coated.

Figure 1:
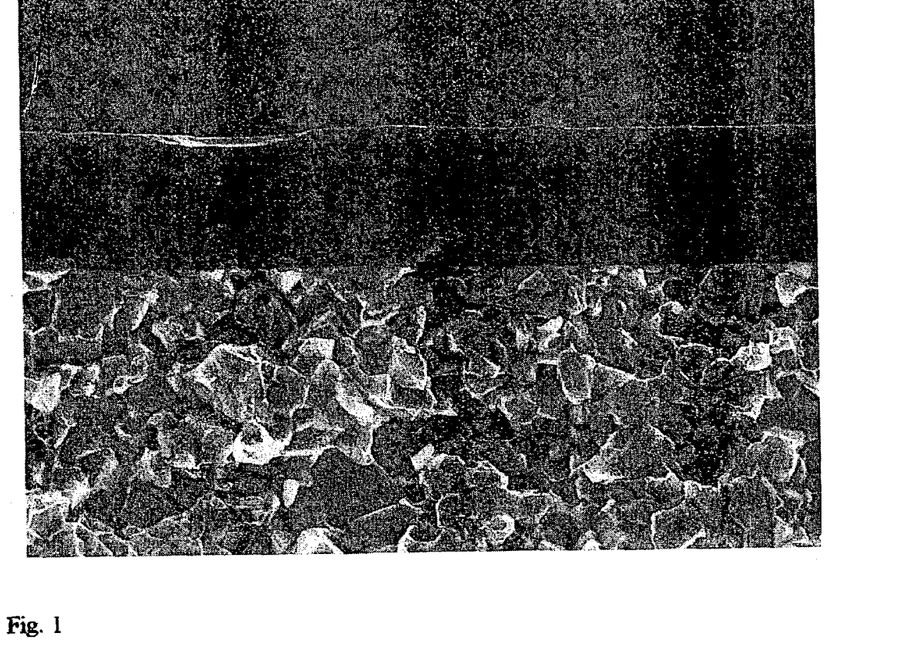
FIG. 1 is a view of a homogeneous (Ti,Al,Cr,Y)N single-layer coating according to the invention with 59% Cr in the metal share on a hard metal substrate.

FIG. 1 was taken with a scanning electron microscope (SEM). It shows a (Ti,Al,Cr,Y)N coating deposited under the specified conditions on a hard metal substrate with 10,000× enlargement. This coating was studied using x-ray photoelectron spectroscopy (XPS) and x-ray diffraction.

XPS Analysis:

A Cameca Nanoscan 50 spectrometer was used. The x-ray radiation source consisted of unmonochromatized Al $K_\alpha$ 12 kV and 25 mA (300 W power). The analyzer had a resolution of 1.5 eV and a step size of 0.1 eV. Ti2p, Al3p, Cr, Y3d and N1s spectra were detected. The sample surface was stripped prior to analysis with an ion beam until the oxygen on the surface was largely removed (lowest level of O1 s peak). The determination of the atomic concentrations in the layers was made using sensitivity factors which were determined from Cr, Ti, TiN, TiAlN and $Y_2O_3$ standards. The small share of carbon in the layers was neglected and was not taken into account in determining the concentrations. The following composition was obtained in the layers:

| Element | Cr [at %] | Ti [at %] | Al [at %] | Y [at %] | N [at %] |
|---|---|---|---|---|---|
| Concentration | 32 | 13 | 9 | 0.5 | 46.5 |

This corresponds to the following composition of the total metal content: Cr 59%, Ti 24%, Al 17%.

Figure 2:
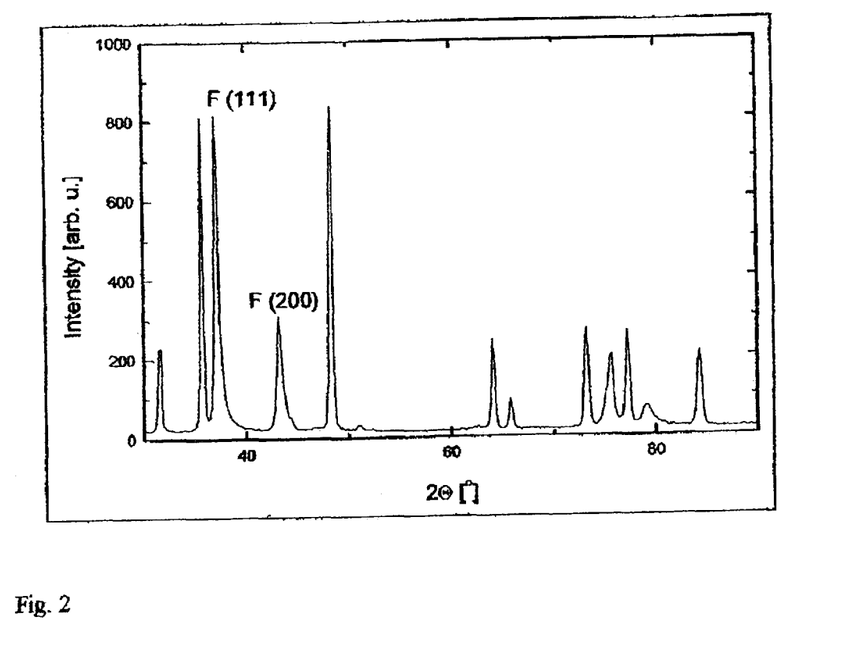
FIG. 2 is an X-ray diffraction diagram of the (Ti,Al,Cr,Y)N coating shown in FIG. 1.

X-ray Diffraction:

The phase determination for the layers was carried out using x-ray diffraction under θ-2 θ geometry with Cu $K_\alpha$ radiation (20 kV). FIG. 2 shows a diffraction chart for the (Ti,Al,Cr,Y)N coating. Here, this is a nitridic mixed phase of the elements Ti, Al and Cr with a <111> texture since the diffraction reflexes of the 111 lattice planes exhibit significantly greater intensities than the 200 and the 220 lattice planes. The diffraction reflexes of the <111>, <200> and <220> lattice planes lie between those of the (Ti,Al)N and CrN standards.

EXAMPLE 2

Using the same arc coating process as in Example 1, (Ti, Al, Cr, Y)N individual layers were deposited on HSS and hard metal shaft tools. The only difference compared to Example 1 was in the setting of the vaporizer power. The discharge current of the Cr cathode was $I_{K/Cr}=200$ A, the current of the (Ti,Al,Y) cathode $I_{K/TiAlY}=300$ A.

Figure 3:
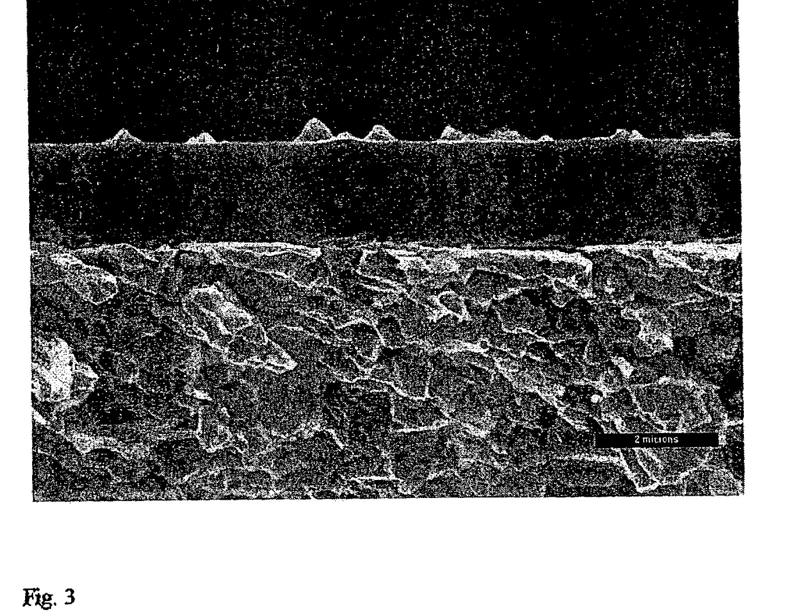
FIG. 3 is a view of a 1.7 μm thick homogeneous (Ti,Al,CrY)N coating according to the invention with 40% Cr in the metal share on a hard metal substrate, using a scanning electron microscope.

FIG. 3 shows a SEM view of the (Ti, Al, Cr, Y)N coating deposited under the specified conditions on a hard metal substrate with 10,000× enlargement. The coating thickness is 1.7 μm.

XPS analysis: In this case as well, the coating composition was determined using x-ray photoelectron spectroscopy (XPS). The deposited layers had the following composition: 23% Cr, 20% Ti, 14% Al, 0.7% Y and 42.3% N. The total metal content of the coating thus consists of 40% Cr, 35% Ti and 25% Al.

Figure 4:
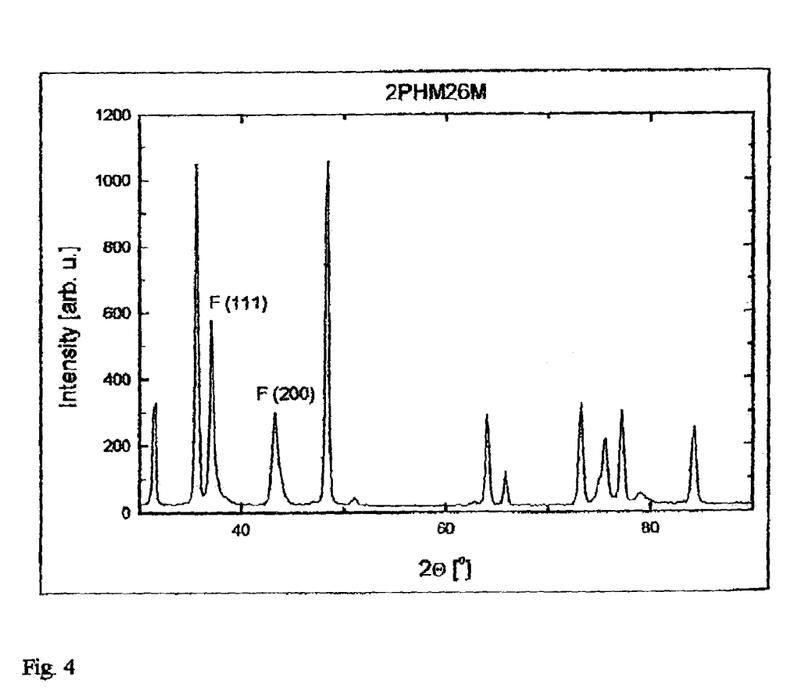
FIG. 4 is an X-ray diffraction diagram of the (Ti,Al,Cr,Y)N coating shown in FIG. 3.

X-ray diffraction: The results of the X-ray diffraction study are shown in FIG. 4. The coating exhibits the same diffraction reflexes as the coating in Example 1, but the intensities are different. Here too, there is a <111> texture, which, however, is somewhat weaker than the texture in Example 1. As in Example 1, it is a nitridic mixed phase of the elements Ti, Al and Cr.

EXAMPLE 3

To fabricate the coatings, an arc process was again used. Here, a Cr cathode and a (Ti,Al,Y) cathode were used for coating deposition in an alternating manner for the deposition of the individual layers of a (Ti,Al,Cr,Y)N/CrN multilayer coating system. The layers have a total thickness of 2.1 μm. The process parameters were: substrate temperature $T_S=450°$ C. bias voltage $U_B=-50$ V, discharge current for the Cr or rather (Ti,Al,Y) cathodes in alternating operation $I_k=300$ A, total ion current on the tools to be coated $J_{ion}=9$ A for CrN deposition and $J_{ion}=7$ A for (Ti,Al,Y)N deposition, pure nitrogen plasma (nitrogen partial pressure $p_{N2}=5$ Pa).

As in the previous examples, the coating process was preceded by a substrate cleaning using plasma-supported etching. HSS tools, full hard-metal tools and flat sample substrates were coated.

Figure 5:
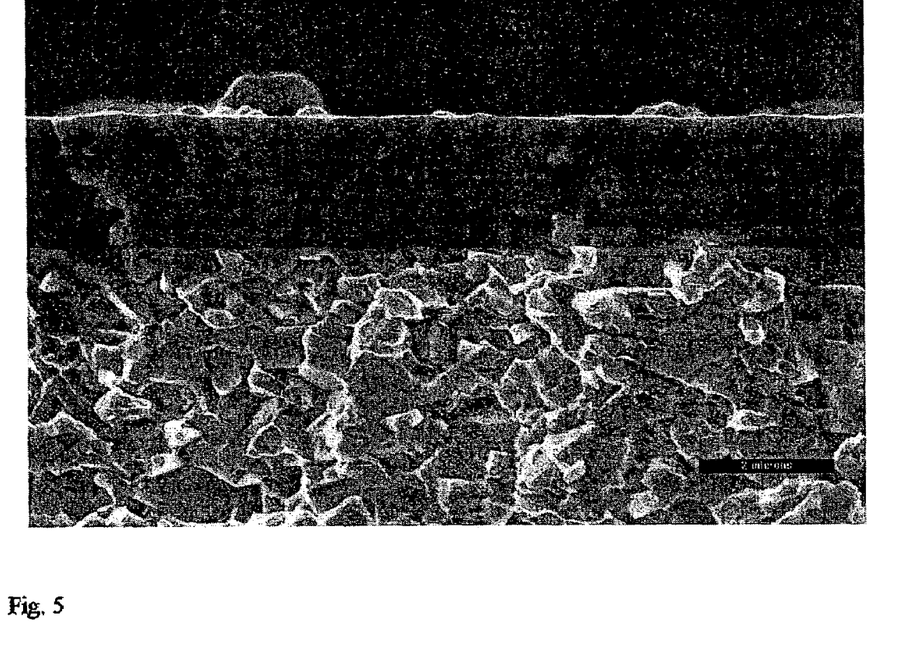
FIG. 5 is a view of a 2.1 μm thick (Ti,Al,Y)N/CrN multiplayer coating according to the invention of a hard metal substrate, using a scanning electron microscope.

FIG. 5 shows a SEM shot of the (Ti,Al,Y)N/CrN multilayer coating deposited under the specified conditions on a hard metal substrate with 10,000× enlargement. The multilayer coating consists of alternating layers of CrN and stochiometric $(Ti_{0.5}Al_{0.5}Y_{0.005})N$. The overall coating system has about 60% Cr in the metal share.

Figure 6:
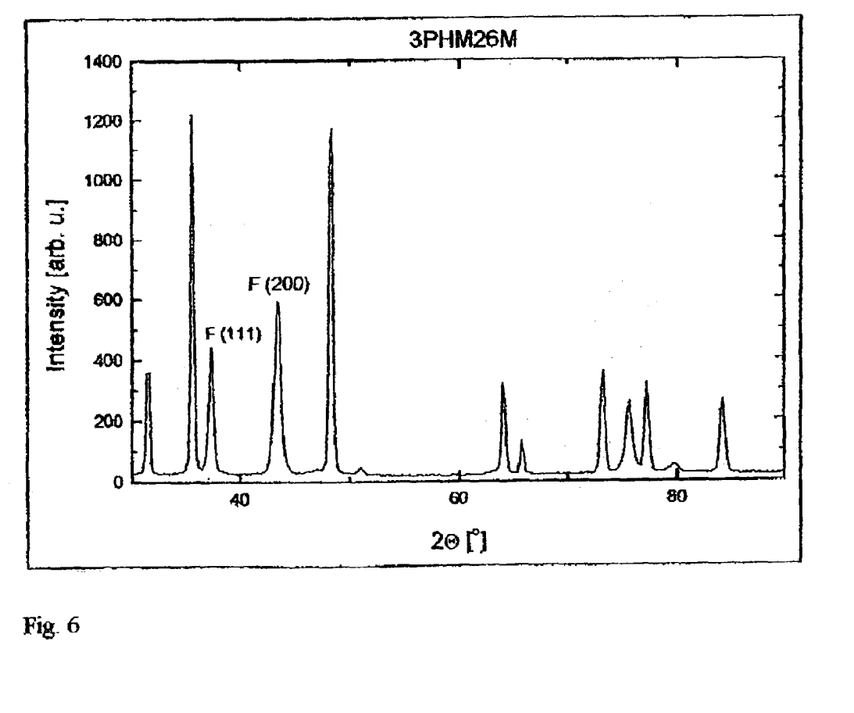
FIG. 6 is an X-ray diffraction diagram of the multilayer coating shown in FIG. 5.

FIG. 6 shows the results of the x-ray diffraction study on the multilayer coating. The crystallites in the individual layers are statistically oriented. Upon enlargement of the (111) and (200) diffraction reflexes, a double peak structure was clearly ascertained for the CrN and (Ti,Al)N phase.

Comparative Test of the Coatings Described in the Examples

The hard metal drill bits with the coatings according to the invention described in Examples 1 to 3 were tested in a field trial with regard to their tool life distance in different materials and compared with other coated tools. The tool life distance of hard metal drill bits is defined as the distance until accretion of the weak mark on the major cutting edge at a certain width. It is normally at 400 μm, but can also be chosen to be smaller in comparative tests if the tool life distances would otherwise be unreasonably large. The wear marks can be seen easily since the gray hue of the coating according to the invention differs clearly from the hue of the hard metal or HSS. To limit the cost, the tests were focused on the less temperature-sensitive hard metal tools. Moreover, they were largely restricted to drilling, which is particularly demanding in terms of cooling and lubrication.

In the comparative tests, tools from one of the Examples 1 to 3 were always tested with multiple tools having other coatings but the same substrate material and the same geometric shape and subject to the same prehandling. In order to find out any possible non-homogeneities of the work piece during the testing, during drilling sufficient distance was maintained so that the comparative drill holes could be placed directly adjacent. As a basic rule, no through holes were drilled, but instead only blind holes with a depth of 5 drill bit diameters.

Drilling in GGG40

Coated full hard metal drill bits with a diameter of 8.5 mm were tested in crucible steel GGG 40. The wear-resistant coating according to the invention described in Example 1 was compared with a proven TiN coating and a (Ti,Al)N/TiN multilayer coating representing the prior art. The following drilling parameters were used: cutting speed $v_0$=110 m/min, advance f=0.26 mm/U, hole depth $a_p$=42.5 mm (5× drill bit diameter), minimal quantity of lubrication.

Figure 7:
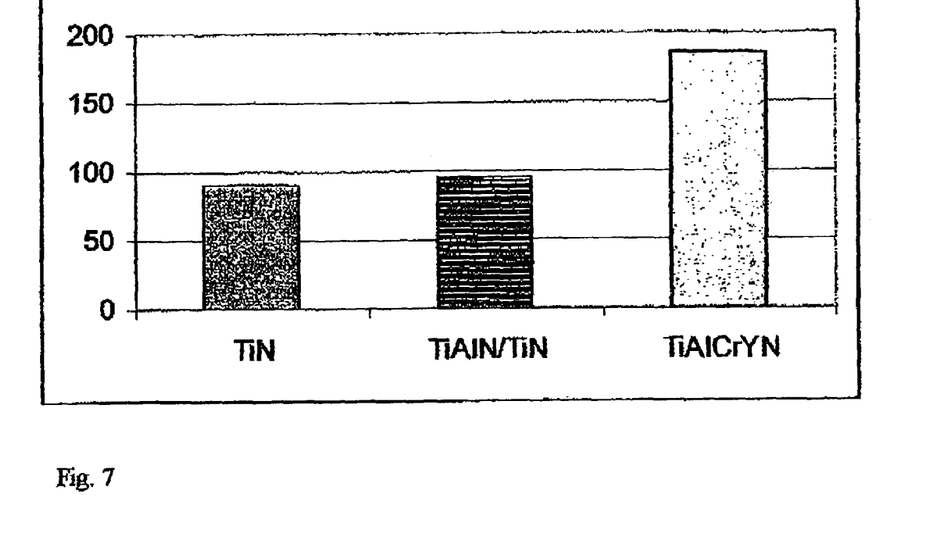
FIG. 7 is a graph illustrating tool life distances for drilling in GGG 40 using a drill bit coated with TiN, a drill bit coated with the FIRE coating (Ti,Al)N/TiN and a drill bit with the (Ti,Al,Cr,Y)N single-layer coating shown in FIG. 1.

At a wear mark width of 80 μm, the tool life distance shown in FIG. 7 is obtained. The tools with the homogeneous (Ti,Al,Cr,Y)N single-layer coating according to the invention with 59% Cr in the metal share exhibited the greatest tool life distance. On average it was 185 m.

Drilling in ST52

Coated full hard metal ratio drill bits with a diameter of 8.5 mm were drilled into structural steel ST52. The wear-resistant coatings according to the invention described in Examples 2 and 3 with 40% Cr in the metal share were compared with a proven TiN coating, a proven (Ti,Al)N coating and a (Ti,Al)N/TiN multilayer coating representing the prior art. The following drilling parameters were used: cutting speed $V_0$=107 m/mm, advance f=0.12 mm/U, hole depth $a_p$=42.5 mm, minimal quantity of lubrication.

Figure 8:
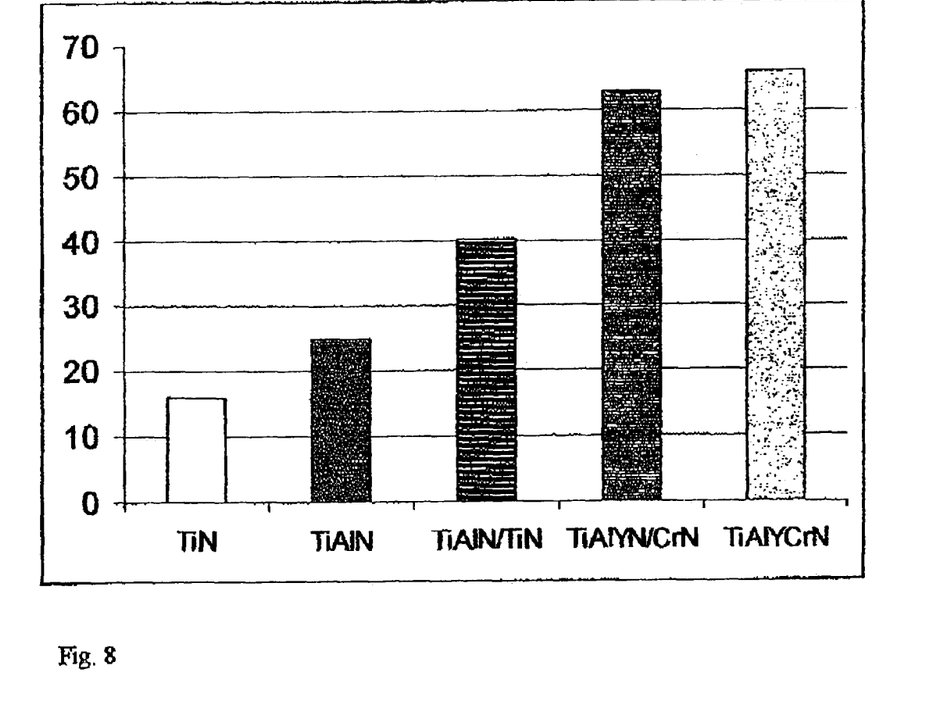
FIG. 8 is a graph illustrating tool life distances for drilling in ST 52 using a drill bit coated with TiN, a drill bit coated with (Ti,Al)N, a drill bit coated with the FIRE coating (Ti,Al)N/TiN, a drill bit coated with the (Ti,Al,Y)N/CrN multilayer coating shown in FIG. 5 and a drill bit with the (Ti,Al,Cr,Y)N single-layer coating shown in FIG. 3.

At a wear mark width of 400 μm, the tool life distance shown in FIG. 8 is obtained. The tools coated according to the invention exhibited the greatest tool life distances at 63 m for the (Ti,Al,Y)N/CrN multilayer coating and 65 m for the (Ti,Al,Cr,Y)N single-layer coating.

Drilling in AlSIM2

Coated full hard metal drill bits with a diameter of 8.5 mm were drilled in high-performance steel AlSIM2. The wear-resistant coating according to the invention described in Example 1 was compared with a proven TiN coating and a (Ti,Al)N/TiN multilayer coating representing the prior art. The following cutting parameters were used: $v_0$=60 m/min, advance f=0.25 mm/U, hole depth $a_p$=42.5 mm, minimal quantity of lubrication.

Figure 9:
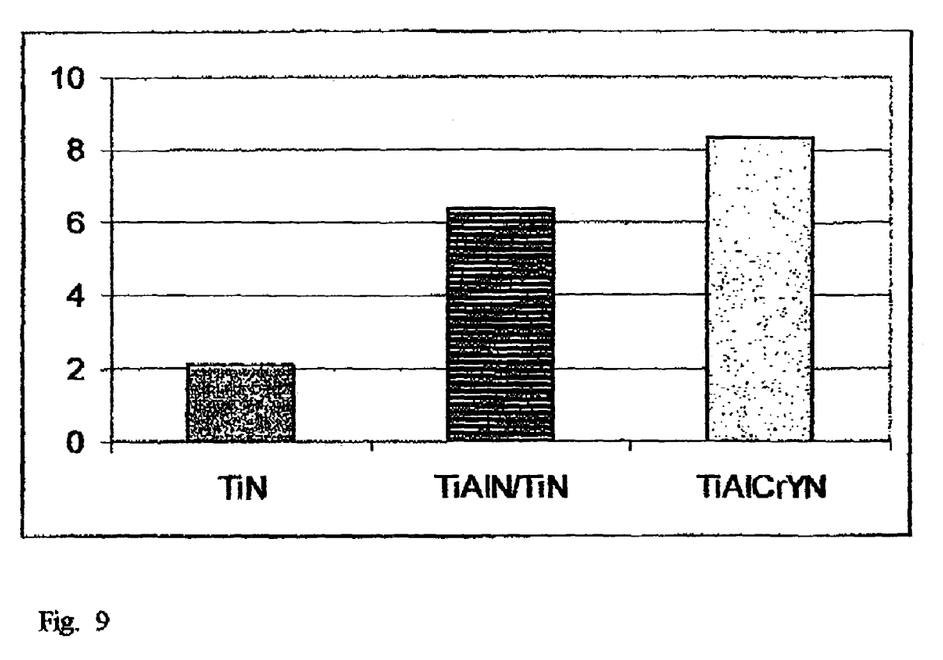
FIG. 9 is a graph illustrating tool life distances for drilling in AlSIM2 using a drill bit coated with TiN, a drill bit coated with the FIRE coating (Ti,Al)N/TiN and a drill bit with the (Ti,Al,Cr,Y)N single-layer coating shown in FIG. 1.

At a wear mark width of 400 μm, the tool life distance shown in FIG. 9 is obtained. The tools with the (Ti,Al,Cr,Y)N single-layer coating according to the invention with 59% Cr in the metal share exhibited the greatest tool life distance. On average it was 8.2 m.

In the foregoing examples it was shown that the wear resistant coating according to the present invention has an excellent wear resistance. Its characteristic resides in that the single layer in the case of a single-layer coating or the individual layers in the case of a multiplayer coating are homogeneous in and of themselves, i.e., the (TiAlY)N or rather (TiAlCrY)N layers represent homogeneous mixed phases having a cubic structure. Y which is homogeneously distributed therein serves for a grain refinement. In addition, neither an adhesive layer nor a subsequent specific heat treatment is necessary in preparing the wear resistant coating according to the present invention, so that the preparation thereof is easy.

Preferably, the coating is deposited by a pure PVD method (Arc coating system) wherein the substrate temperature amounts to a maximum of 450° C.

The overall thickness of the wear resistant coating is preferably between 1.5 and 5 μm.

In case of a multi layer coating, preferably 10 to 15 individual layers are deposited.

The thickness of each individual layer of the multi layer coating lies between 100 and 500 nm, in particular between 100 and 200 nm.

It is further preferred, that the single layers of a multi layer system have the same thickness. In this case it is in particular preferred that the outermost layer (CrN layer) has a thickness being up to 100% larger than the thickness of each of the other single layers.

Although the best mode contemplated by the inventor of carrying out the present invention is disclosed above, practice of the present invention is not limited thereto. It will be manifest that various additions, modifications and rearrangements of the features of the present invention may be made without deviating from the spirit and scope of the underlying inventive concept.

What is claimed is:

1. A wear-resistant coating on metal-removing tools, the coating including nitrides with metal components Cr, Ti and Al and Yttrium for grain refining, said wear-resistant coating comprising:
   an atomic Cr share of more than 30% and less than about 65%;
   an atomic Al share of 15% to 35%;
   an atomic Ti share of 16% to 40%;
   in each case referred to the total metal content in the entire wear-resistant coating, and the Cr share is greater than the Al share and the Ti share; and
   wherein the composition of the entire coating is homogeneous mixed phase.

2. The wear-resistant coating of claim 1, wherein the atomic Cr share is 30% to 60% of the total metal content.

3. The wear-resistant coating of claim 2, wherein the atomic Cr share is 40% to 60% of the total metal content.

4. The wear-resistant coating of claim 1, wherein the metal removing tools are rotary metal-removing tools.

5. The wear-resistant coating of claim 1, wherein the atomic Al share is 17% to 25% of the total metal content.

6. The wear-resistant coating of claim 1, wherein the atomic Ti share is 16% to 35% of the total metal content.

7. The wear-resistant coating of claim 6, wherein the atomic Ti share is 24% to 35% of the total metal content.

8. A wear-resistant coating on metal-removing tools, the coating including nitrides with metal components Cr, Ti and Al, and Yttrium for grain refining, said wear-resistant and coating comprising:
- an atomic Cr share of 30% to 65%;
- an atomic Al share of 15% to 35%;
- an atomic Ti share of 16% to 40%;
- in each case referred to the total metal content in the entire wear-resistant coating, and the Cr share is greater than the Al share and the Ti share; and
- wherein the composition of the entire wear-resistant coating is comprised of multiple layers that are homogeneous in and of themselves, consisting in alternation on the one hand a homogenous layer of Ti, Al, Y, and N, and on the other hand a homogenous layer of CrN; and
- wherein the thickness of each individual layer of the wear-resistant coating is at least 100 nm.

9. The wear-resistant coating according to claim 8, wherein the topmost layer of the wear-resistant coating is formed by the CrN layer.

10. The wear-resistant coating of claim 8, wherein in the homogeneous layers of Ti, Al, Y and N the atomic share of Ti is 38% to 50%, the atomic share of Aluminum is 48% to 60% and the atomic share of Yttrium is less than 4% in each case referred to the total metal content in the homogeneous layers of Ti, Al, Y and N.

11. The wear-resistant coating of claim 8, wherein the atomic Cr share is 30% to 60%.

12. The wear-resistant coating of claim 11, wherein the atomic Cr share is 40% to 60% of the total metal content.

13. The wear-resistant coating of claim 10, wherein the atomic Al share is 17% to 25% of the total metal content.

14. The wear-resistant coating of claim 10, wherein the atomic Ti share is 16% to 35% of the total metal content.

15. The wear-resistant coating of claim 14, wherein the atomic Ti share is 24% to 35% of the total metal content.

16. The wear-resistant coating of claim 10, wherein the metal removing tools are rotary metal-removing tools.

* * * * *